United States Patent [19]

Fischer et al.

[11] 4,330,829
[45] May 18, 1982

[54] HELICOPTER FLIGHT STABILITY CONTROL INDUCED OSCILLATION SUPPRESSION

[75] Inventors: William C. Fischer, Monroe; Don L. Adams, Fairfield, both of Conn.

[73] Assignee: United Technologies Corporation, Hartford, Conn.

[21] Appl. No.: 166,010

[22] Filed: Jul. 7, 1980

Related U.S. Application Data

[63] Continuation of Ser. No. 6,313, Jan. 24, 1979, abandoned.

[51] Int. Cl.³ .................. G06G 7/70; B64C 11/34
[52] U.S. Cl. .................. 364/434; 244/17.13; 244/179; 244/221
[58] Field of Search ............... 364/433, 434, 724, 825; 244/17.13, 179, 182, 194, 181, 177, 221, 228, 234, 236; 318/584, 585, 586, 628; 114/275; 328/167

[56] References Cited

U.S. PATENT DOCUMENTS 3,049,189  8/1962  Riordan .................. 114/275 X
4,127,245  11/1978 Tefft et al. ............... 244/17.13

Primary Examiner—Joseph F. Ruggiero
Attorney, Agent, or Firm—M. P. Williams

[57] ABSTRACT

Oscillations in helicopter attitude sustained by the aerodynamic response of the helicopter to an automatic flight control system which is responsive to an attitude sensor, are eliminated by band reject (notch) filtering of a control system stability command to the aircraft, derived from rate of changes of such attitude at a frequency related to the aircraft attitude oscillations induced by the rate-controlled stability compensation.

4 Claims, 1 Drawing Figure

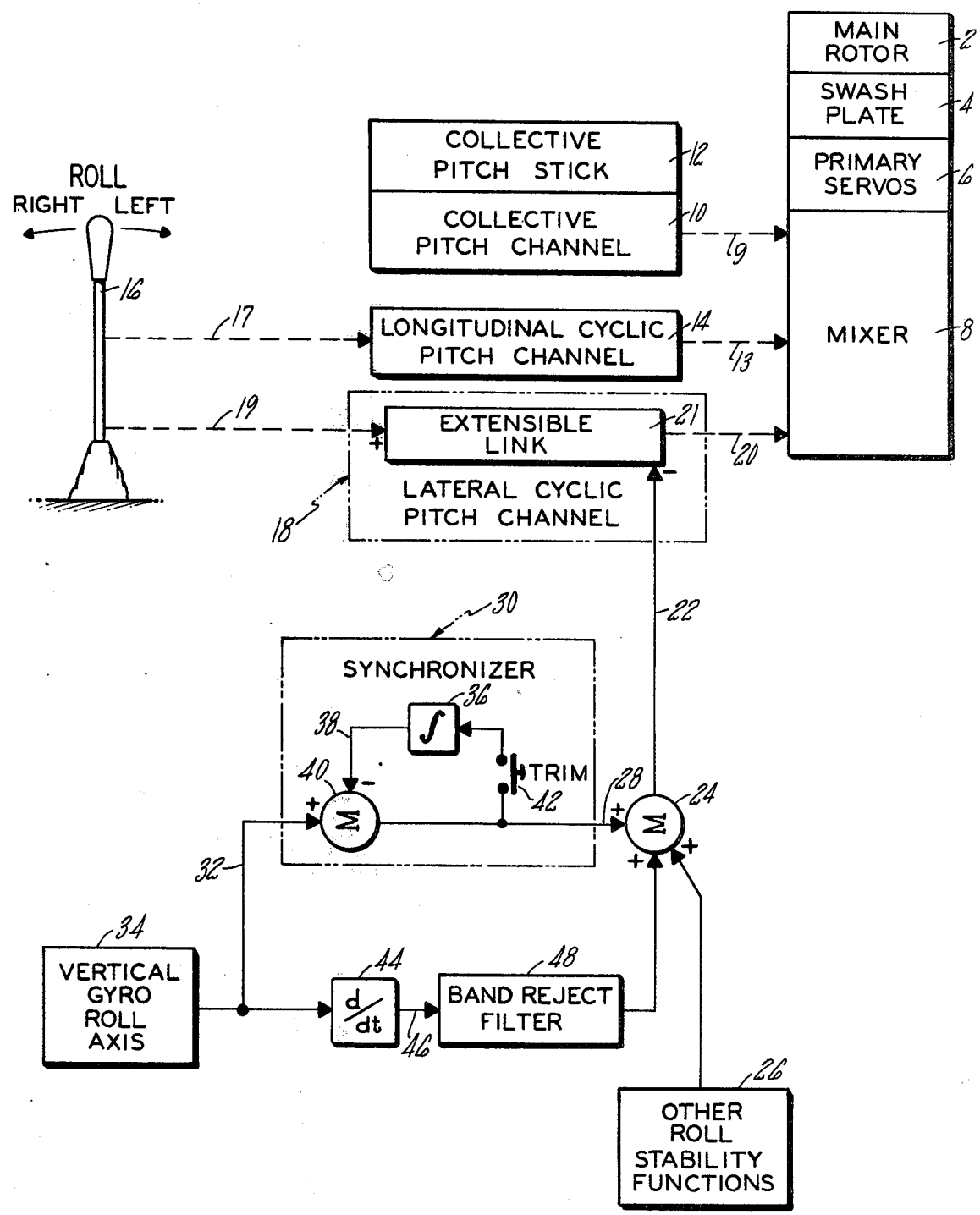

HELICOPTER FLIGHT STABILITY CONTROL INDUCED OSCILLATION SUPPRESSION

This is a continuation of application Ser. No. 6,313 filed on Jan. 24, 1979, now abandoned.

BACKGROUND OF THE INVENTION

1. Field of Art

This invention relates to helicopter control systems, and more particularly to reduction of helicopter oscillations sustained by the helicopter automatic control system.

2. Description of the Prior Art

It is known in the art to provide helicopters with automatic flight control systems (AFCS) which sense various parameters, such as attitude, velocity and acceleration in various axes, to stablize the aircraft both in terms of long-term flight path (autopilot) and in terms of short-term undesirable perturbations (such as may be induced by wind gusts and the like). The utilization of automatic flight control necessarily provides a closed loop system which includes the aircraft response and the commands generated in response to sensors which indicate the aircraft response, thereby inducing changes in the aircraft response. Necessarily, being a closed loop system, the opportunity for creation of oscillatory interaction always exists. In the past, various mechanical characteristics of helicopters and their control systems have tended to alleviate any tendency for oscillatory coupling between the helicopter and its automatic flight control systems. For instance, the main rotor blade system of the typical helicopter has very large inertia and includes a fair amount of damping. Mechanical play in linkage systems masks many small responses. The general transfer characteristic of the automatic flight control command in response to changes in aircraft attitude and position (including gain and frequency response) also may be limited so as to avoid oscillation. In some automated control systems, trim valves may operate as hydraulic dampers when not providing trim correction input commands to the helicopter. And, mass-balancing of mechanical controls may provide specific oscillation compensation.

In helicopters capitalizing on new technology, the rotor blades may be lower in size and weight and therefore provide a much lower inertia, thereby requiring less mechanical damping to be associated therewith. Similarly, the rotor blades themselves are capable in such a case of responding more rapidly to commands applied thereto. Mass-balancing adds weight and slows response, and may therefore be undesirable. Demands for helicopters having improved performance response characteristics, with tighter linkages and higher gains and frequency response in the automated control systems, are therefore much more prone toward oscillation induced by coupling between the helicopter response and the automatic flight control system commands provided thereto.

SUMMARY OF THE INVENTION

Objects of the invention include provision of specific compensation for helicopter oscillations sustained or amplified by automatic flight control systems therein.

According to the present invention, oscillations of a helicopter sustained or amplified by an automatic flight control system stability command signal for commanding a response in the control surfaces of a helicopter as a consequence of a rate of change of helicopter attitude, are significantly reduced by means of band reject filtering of the rate-responsive command signal, the frequency of the band reject filter being selected to maximize reduction of the undesirable oscillations while permitting maximum rate-responsive compensation signals at other than the undesirable oscillation frequency, to thereby retain maximum stability response capability.

The present invention provides electrical oscillation compensation in a selected frequency band, thereby permitting a helicopter and automatic flight stability control system combination which allows maximum helicopter performance. The invention is readily adapted to a wide variety of helicopter/automatic control system combinations and is easily implemented using technology which is readily available in the art. The invention avoids oscillations while permitting enhanced performance in helicopters having automatic flight stability control systems.

The foregoing and other objects, features and advantages of the present invention will become more apparent in the light of the following detailed description of an exemplary embodiment thereof, as illustrated in the accompanying drawing.

BRIEF DESCRIPTION OF THE DRAWING

The sole FIGURE herein comprises a simplified schematic block diagram of an exemplary embodiment of the present invention in a single channel of a helicopter.

DETAILED DESCRIPTION

The cyclic and collective pitch of the blades of the main rotor 2 of a helicopter is controlled by a swash plate 4 in response to primary servos 6 as is known in the art. The primary servos 6 relate to the various controllable axes of the swash plate but are themselves controlled in response to the three pitch channels of the helicopter which are combined in a mixer 8, all as is known in the art. The mixer 8 is responsive through mechanical linkage 9 to a collective pitch channel 10, to which pilot inputs are provided through the collective pitch stick 12; it is also responsive through mechanical linkage 13 to a longitudinal cyclic pitch channel 14 to which the pilot can supply inputs through a cyclic pitch stick 16 connected thereto by mechanical linkage 17; and, a lateral cyclic pitch channel 18 is also responsive through mechanical linkage 19 to the cyclic pitch stick 16 to provide an input to the mixer 8 via mechanical linkage 20. Although only single sticks 12, 16 are illustrated, a helicopter will normally have dual controls connected through the same mechanical linkage (such as the linkage 17, 19).

As illustrated herein, the lateral cyclic pitch channel 18 is a simple channel, having a direct (unboosted) mechanical connection between the lateral axis of the cyclic pitch stick 16 and the mixer 8, but with a series automatic flight control system (AFCS) actuator connected into the linkage. As an example, the actuator may comprise an extensible link 21, which may comprise an electrically actuated jack-screw type of extensible link. This is operated by a signal on a line 22 from a summing junction 24 that receives inputs, inter alia, from various roll stability function circuits 26. Alternatively, the extensible link 21 may be an hydraulic extensible link, in which case the signal on the line 22 may operate an electromechanical valve for controlling the extension of the link. In more complex systems, the lateral cyclic pitch channel 18 may include an auxiliary servo for amplifying the mechanical forces from the stick 16 before applying them to the mixer 8, as described in Tefft et al U.S. Pat. No. 4,127,245. In such case, the auxiliary servo may have a trim valve for an automatic flight control system as described in the Tefft et al patent. In some systems, the auxiliary servo may additionally have automatic flight control system valves which would receive roll stability commands (such as those provided on a line 22) directly into the auxiliary servo, thereby eliminating the need for the extensible link 21.

One common form of automatic flight control input to a lateral cyclic pitch channel is roll trim. As illustrated in the drawing, roll trim may be provided as an input on a line 28 from a synchronizer 30 that is responsive to a roll angle signal on a line 32 provided by the vertical gyro roll axis 34. The synchronizer 30 (which is a positional synchronizer rather than a temporal synchronizer) may take various forms, such as a fast, stable integrator circuit 36 which provides negative feedback on a line 38 to a summing junction 40, the input of the integrator 36 being allowed to follow the output of the summing junction whenever a trim switch 42 is closed, release of the trim switch 42 isolating the input to the amplifier 36, thereby memorizing the roll angle at the time trim is engaged. Normally trim is engaged for a zero roll angle (level flight). On the other hand, the synchronizer 30 may be a sample and hold circuit of any variety, summed negatively with the vertical gyro roll axis output on a line 32. In a digital system, the synchronizer 30 may be digital storage register that is updated from the vertical gyro roll axis while the trim switch is closed, and remains static after the trim switch is open, providing a digital signal for comparison, cyclically, with the vertical gyro roll axis output.

The control of main rotor blade pitch of a helicopter, the variations therein, and the roll trim circuitry, as described thus far are well known in the art and form no part of the present invention.

According to the present invention, oscillations in aircraft attitude, resulting in excitation of fuselage bending modes, created by the aerodynamic response of the aircraft to attitude-rate-controlled commands, in turn induced by rates of change in the aircraft attitude, may be substantially mitigated (reduced or eliminated) by means of suitable electrical filtering of an attitude rate stability command. As illustrated in the drawing for the lateral cyclic pitch channel, the roll angle signal on the line 32 is differentiated in a differentiator circuit 44 to provide a roll rate signal on a line 46 which is fed through a band reject filter 48 and applied as an input to the summing junction 24. It is known in the art to provide the roll rate signal on a line 46 directly as an input (such as to the summing junction 24) to a lateral cyclic pitch channel for stability; it is also known, however, that the degree of roll rate compensation may be somewhat critical: too little roll rate compensation will allow the aircraft attitude to respond excessively to gusts and the like; too much compensation will induce oscillations in roll attitude. The present invention, by including the band reject filter 48, reduces or eliminates this criticality by decoupling the aircraft response from rates of change in its attitude at low, resonant frequencies of the airframe.

The band reject filter 48 may be of a well known type in which a summing amplifier takes the difference between the signal on the line 46 and a band-pass filtered derivation of the signal on the line 46. Active filters are preferred since these allow dynamic adjustments and are relatively stable. The band reject filter 48 may be designed in accordance with principles set forth in Chapter 8 of the well-known Burr-Brown Hankbook: "Operational Amplifiers, Design and Applications", edited by J. G. Graeme et al, McGraw Hill, New York City, 1971. For roll stability of the present invention, the transfer function, 1-H, of the band reject filter 48 may be simplified from the teachings of Burr-Brown as follows:

$$1 - H = 1 - K \frac{S^2 + k\frac{2\pi f}{Q} S + (2\pi f)^2}{S^2 + \frac{2\pi f}{Q} S + (2\pi f)^2}$$

where:
f = the design center frequency
Q = quality factor
K = a general gain factor
k = attenuation factor As examples only, typical values in a medium commercial helicopter may be:

|       | Minimum | Preferred | Maximum |
|-------|---------|-----------|---------|
| f(Hz) | 3.00    | 3.33      | 4.00    |
| Q     | 2.0     | 4.2       | 6.0     |
| k     | 0.0     | 0.025     | 0.05    |
| K     | —       | 1.0       | —       |

In the more general case, f may vary from 2 Hz to 6 Hz, and the bandwidth may vary, within 1 Hz. The attenuation in the reject band may be on the order of 20:1.

The + and − signs in the drawing simply illustrate that the limited-authority AFCS response to pilot-induced commands are naturally opposite thereto.

In a digital system of the type disclosed in commonly-owned Murphy et al application FAIL-OPERATIONAL, FAIL-SAFE MULTI-COMPUTER CONTROL SYSTEM, Ser. No. 938,583, filed on Aug. 31, 1978, U.S. Pat. No. 4,270,168, the filter may comprise any one of a wide variety of known filter algorithm programs. In any case, the teachings in the prior art with respect to filters, as related to other applications, are applicable in the implementation of the present invention. For instance, as is known, the Q and k of the filter should be chosen to provide a desired bandwidth while at the same time avoiding excessive phase shifts at frequencies outside of the desired attenuation. In the present case, it is desired that there be little or no phase shift for frequencies on the order of 0-2 Hz and above about 5 Hz. However, it has been found that phase shifts on the order of ±10° at 2 Hz and 5 Hz are tolerable in the example given herein in a typical helicopter automatic flight control system.

The invention is described herein as being employed in the inner loop (that portion of the control system which does not move the pilot's stick) of an automatic flight control system lateral cyclic pitch (roll) channel, which has limited authority (such as ±10% of full command). The invention is obviously implementable in a similar fashion in other channels (such as longitudinal cyclic pitch) of a helicopter automatic flight control system. These are the two channels of a helicopter in which the invention will find its greatest utility, although it may be used elsewhere, as well. Further, as is described with respect to the drawing hereinbefore, the particular system in which the invention is implemented is not too significant: there can be a wide variety of mechanical linkage/auxiliary servo/AFCS actuator combinations, and the invention may still be employed. Also, the invention may be applied in various portions of such systems depending upon the particular implementation of automatic flight control system in which the invention is to be utilized. However, it is the fast, high gain response inherent in the rate-controlled inner stability loop of an AFCS that has the potential for inducing oscillations and therefore the invention will find its greatest value in such loops.

To determine the desired frequency, bandwidth and the like, the actual flight control response characteristics of the helicopter may be monitored, such as by sensing perturbations in the actual command signals (eg, the roll stability signal on the line 22 in the example herein), analysis of which will provide an indication of the frequency and magnitude of undesirable oscillations. Even then, a band reject filter 48 may be tuned somewhat in test flights of any given type of helicopter, while monitoring the perturbations in the roll stability signal on the line 22, until desired effects are achieved. Although shown as applied to a roll rate signal derived from the vertical gyro roll axis in the present exemplary embodiment, the filtering may be applied, in a more complex system, to other stability signal input command components (as depicted in the roll channel generally by the block 26 in the drawing).

Similarly, although the invention has been shown and described with respect to a typical embodiment thereof, it should be understood by those skilled in the art that various changes, omissions and additions may be made therein and thereto, without departing from the spirit and the scope of the invention.

Having thus described a typical embodiment of our invention, that which we claim as new and desire to secure by Letters Patent is:

1. A control for a helicopter having an outer loop control system coupled with the pilot control members for controlling a given attitude axis of the helicopter and an automatic flight control system inner stability loop related to said given attitude axis, comprising:
    means providing a desired attitude signal indicative of a desired helicopter attitude in said given attitude axis;
    means for sensing the attitude of the helicopter in said given attitude axis and for providing an actual attitude signal indicative thereof;
    means responsive to said desired attitude signal and to said actual attitude signal to provide an attitude hold signal input to said inner stability loop as a function of the difference between said desired attitude signal and said actual attitude signal;
    means for sensing the rate of change of attitude of the helicopter in said given attitude axis to provide an attitude rate of change signal; and
    a band reject filter connected to receive said attitude rate of change signal, the output of said band reject filter being applied as an input to said inner stability loop, said band reject filter having a reject frequency band including the frequency of an undesirable oscillation of said helicopter sustained by said inner stability loop in said given attitude axis, whereby the magnitude of attitude rate control over stability can be increased beyond the magnitude which would cause oscillations in the absence of said band reject filter.

2. A control according to claim 1 wherein said band reject filter provides on the order of 20:1 attenuation to frequencies within said reject band.

3. A control according to claim 1 wherein said band reject filter has a reject band centered at a frequency of between 2 Hz and 6 Hz.

4. A control according to claim 3 wherein said band reject filter has a finite reject bandwidth of less than 1 Hz.

* * * * *